(12) United States Patent
Hirose

(10) Patent No.: US 8,708,379 B2
(45) Date of Patent: Apr. 29, 2014

(54) VEHICLE BUMPER STRUCTURE

(75) Inventor: Yoshitaka Hirose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/604,998

(22) Filed: Sep. 6, 2012

(65) Prior Publication Data

US 2013/0076050 A1      Mar. 28, 2013

(30) Foreign Application Priority Data

Sep. 28, 2011   (JP) .................................. 2011-211975

(51) Int. Cl.
*B60R 19/02*      (2006.01)

(52) U.S. Cl.
USPC ........................................................ 293/102

(58) Field of Classification Search
USPC ............ 293/126, 102, 120, 133, 132; 296/30, 296/198, 193.09, 187.09
See application file for complete search history.

(56) References Cited

U.S. PATENT DOCUMENTS 7,207,617 B2 *   4/2007   Pelini ............................. 296/29

FOREIGN PATENT DOCUMENTS

JP            2505898 B2      6/1996

\* cited by examiner

*Primary Examiner* — Joseph Pape
*Assistant Examiner* — Dana Ivey
(74) *Attorney, Agent, or Firm* — Westerman, Hattori, Daniels & Adrian, LLP

(57) ABSTRACT

A rear bumper includes a bumper central part configured to cover a rear end portion of a vehicle, a pair of bumper side parts configured to extend from both ends of the bumper central part toward respective wheel housings, a wheel arch portion disposed at an end of each of the bumper side parts, a flange formed integrally with an inner surface of each of the bumper side parts, and a wheel arch bracket disposed on the flange and configured to support fender components. The wheel arch bracket includes a component supporting portion configured to support the fender components, a flange mount portion disposed opposite to the component supporting portion and attached to the flange, and a plurality of vertical walls configured to extend from the component supporting portion toward the flange mount portion.

5 Claims, 7 Drawing Sheets

FIG. 1
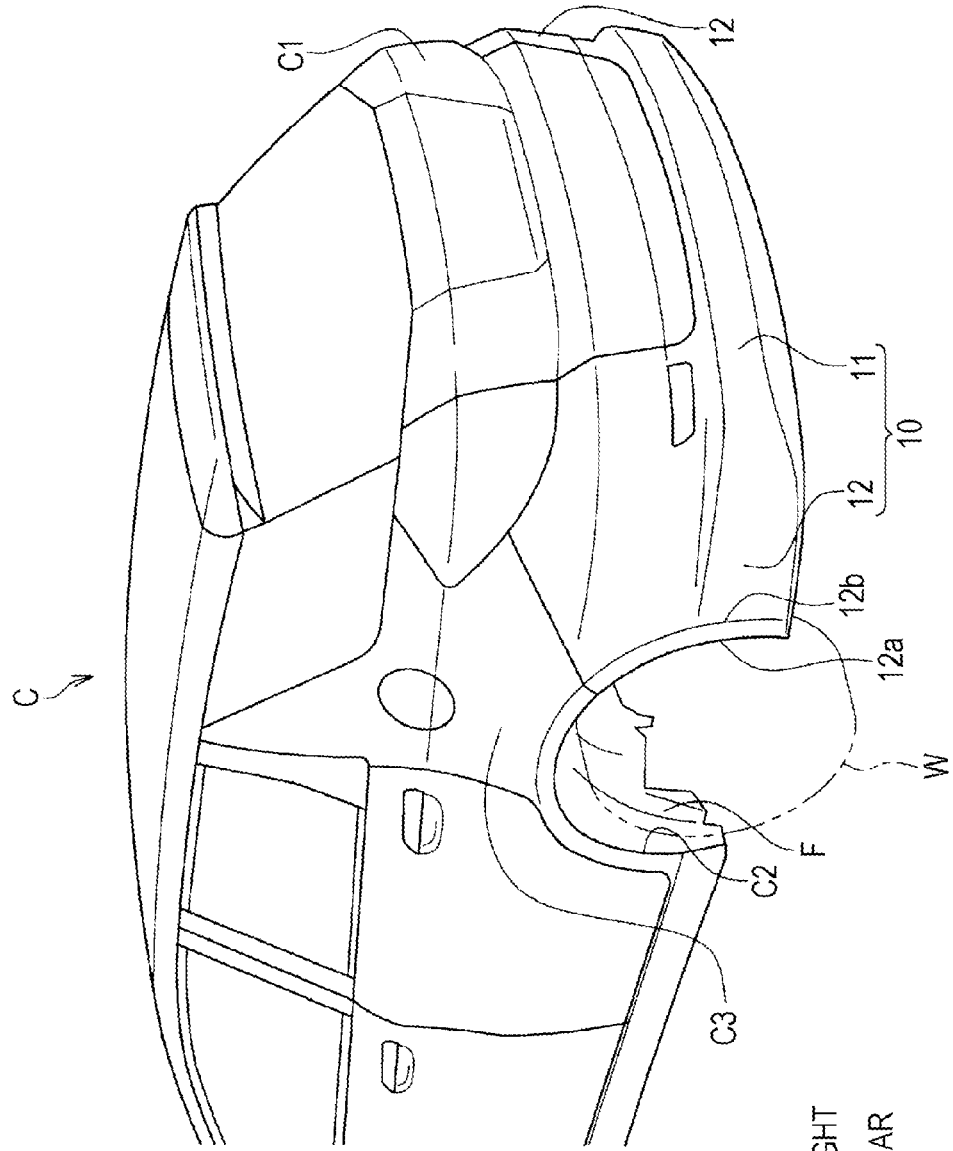
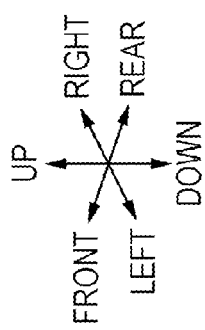

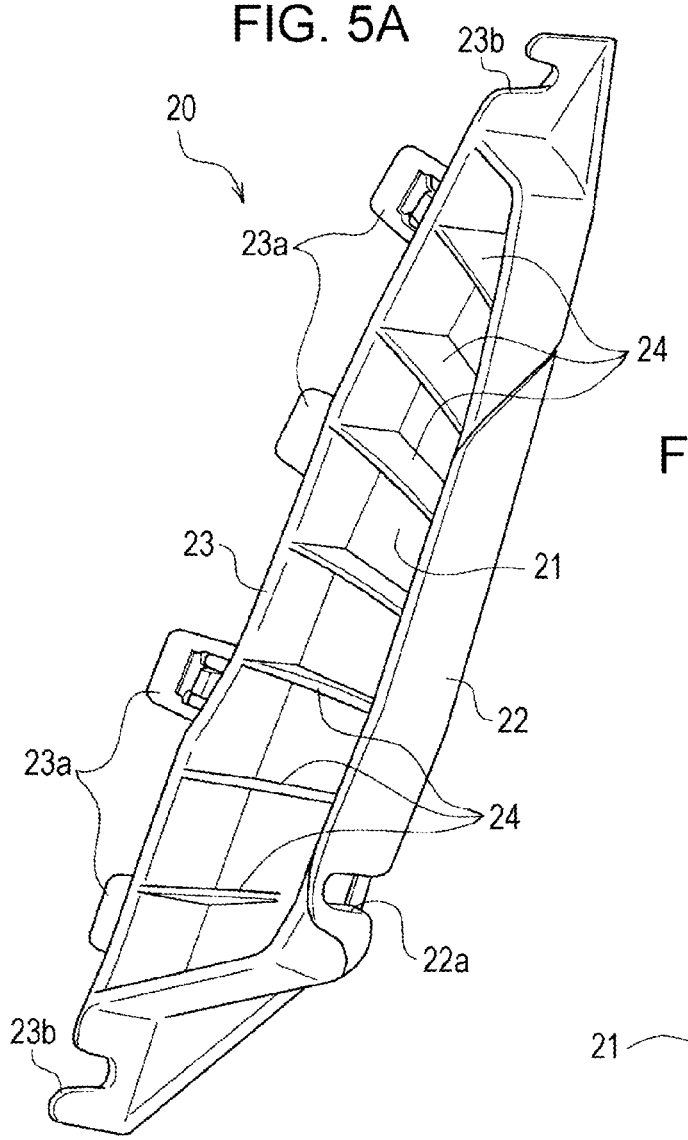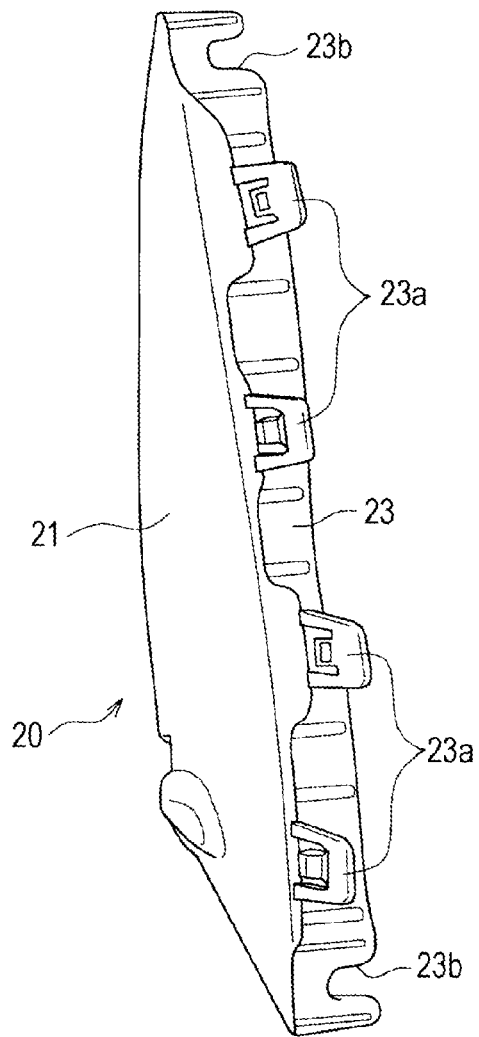

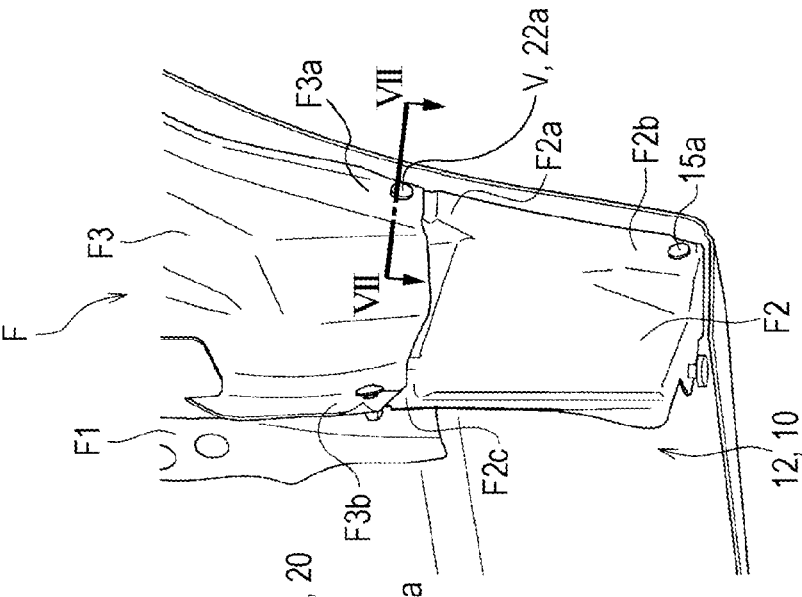
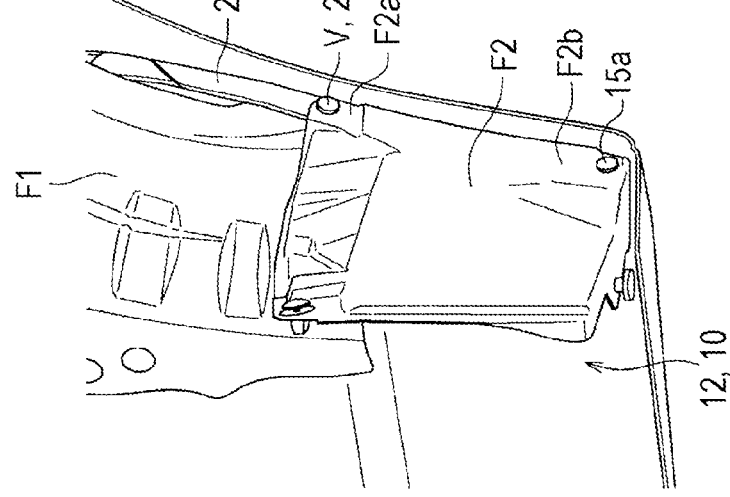
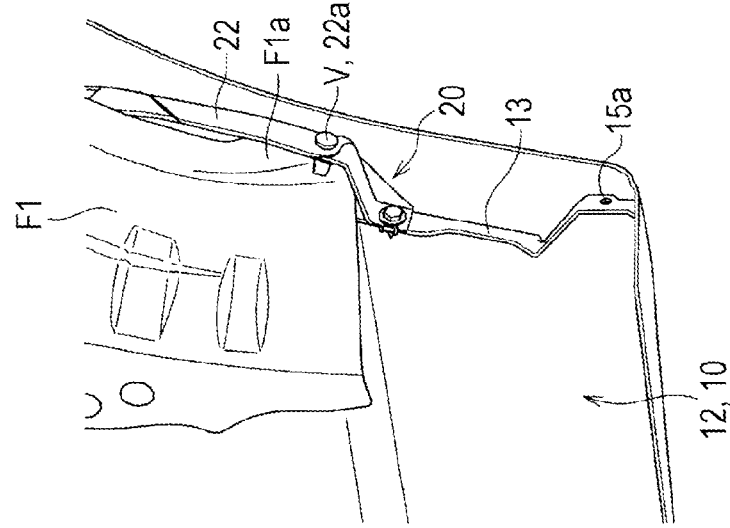

VEHICLE BUMPER STRUCTURE

CROSS REFERENCES TO RELATED APPLICATIONS

The present application claims priority under 35 U.S.C. §119 to Japanese Patent Application No. 2011-211975, filed Sep. 28, 2011, entitled "Vehicle Bumper Structure." The contents of this application are incorporated herein by reference in their entirety.

TECHNICAL FIELD

Embodiments discussed herein are related to a vehicle bumper structure.

BACKGROUND

A vehicle bumper structure is known, for example, which extends in the right-and-left direction at a rear end of the vehicle, extends forward to reach wheel arches at right and left ends thereof, and is thereby formed into a substantially U-shape in plan view. For example, Japanese Patent No. 2505898 describes a structure in which a flange for attaching a fender component, such as a wheel housing outer, thereto is substantially vertically disposed on the inner surface of a rear bumper side (bumper side part) that faces a wheel arch. A closing plate that internally covers a boundary between a rear fender and the bumper side part is attached to the flange. This prevents muddy water splashed inside the wheel arch from oozing through the boundary.

In the structure of the related art, where the fender component is directly attached to the flange, the position of the flange may be restricted by the shape of the fender component or, conversely, the shape of the fender component may be restricted by the position of the flange. As a result, the degree of freedom of designing the fender component and the flange is reduced.

In recent years, there has been a need to reduce the bulge of the bumper side part caused by wind pressure during running of the vehicle. However, the closing plate provided inside the bumper side part of the related art is flat in shape, and makes little contribution to enhanced stiffness of the bumper side part.

SUMMARY

The present application describes a vehicle bumper structure that can improve the degree of freedom of designing fender components and flanges, and enhance the support stiffness of bumper side parts.

A vehicle bumper structure according to an embodiment includes a bumper central part configured to extend in a vehicle width direction to cover an end portion of a vehicle; a pair of bumper side parts configured to extend from both ends of the bumper central part toward respective wheel housings; a wheel arch portion disposed at an end of each of the bumper side parts to face the corresponding wheel housing; a flange configured to stand on an inner surface of each of the bumper side parts, the flange being formed integrally with the bumper side part; and a wheel arch bracket disposed on the flange to extend in an up-and-down direction of the vehicle, the wheel arch bracket being configured to support fender components. The wheel arch bracket includes a component supporting portion configured to support the fender components, a flange mount portion disposed opposite to the component supporting portion and attached to the flange, and a plurality of vertical walls configured to extend from the component supporting portion toward the flange mount portion.

In this configuration, the wheel arch bracket is disposed on the flange, and the component supporting portion can be adjusted to fit the shapes of the fender components by varying the mounting position and the width of the wheel arch bracket in the front-and-rear direction of the vehicle. Thus, a high degree of design freedom can be ensured. At the same time, since the component supporting portion is on the inner surface of the bumper side part and thus is invisible from outside the vehicle, enhanced appearance (or design characteristics) can be achieved.

Additionally, in this configuration, where the wheel arch bracket includes the vertical walls extending from the component supporting portion toward the flange mount portion, it is possible to improve stiffness for supporting the fender components disposed inside the bumper side part and reduce the bulge of the bumper side part caused by wind pressure during running of the vehicle.

Also, in this configuration, the flange is integrally molded with the bumper side part. Thus, as compared to the configuration where the flange is formed separately, the accuracy of fitting the fender components can be more stabilized. At the same time, the number of components and the number of worker-hours can be reduced.

It is preferable that the flange mount portion have a plurality of engaging portions configured to engage with the flange, the engaging portions being staggered in the up-and-down direction of the vehicle; the bumper side part be curved to bulge toward the outside of the vehicle at the center thereof in the up-and-down direction of the vehicle; and the wheel arch bracket be disposed along the inner surface of the bumper side part.

In this configuration, where the engaging portions of the flange mount portion are staggered in the up-and-down direction of the vehicle and the wheel arch bracket is disposed along the inner surface of the bumper side part, components in the vicinity of the bumper side part are brought together. It is thus possible to further improve stiffness for supporting the fender components in the bumper side part.

It is preferable that the flange have a bent part bent toward the wheel arch portion and configured to create a space with the bumper side part; the bent part have a component mount portion to which the fender components are attached; and the component mount portion be located on a virtual line passing through the component supporting portion, the virtual line being substantially parallel with the wheel arch portion.

In this configuration, the flange is bent toward the wheel arch portion, and the component mount portion is located on the virtual line passing through the component supporting portion and substantially parallel with the wheel arch portion. This increases the section modulus of the bumper side part and can further improve stiffness for supporting the fender components in the vicinity of the wheel arch portion.

Additionally, since the space is created between the bent part and the bumper side part, it is possible to reduce occurrence of sink marks on the outer surface (design surface) of the bumper side part at a position corresponding to the bent part, allow free positioning of the flange, ensure a high degree of design freedom, and enhance design characteristics.

It is preferable that each of the bumper side parts have a ridge portion on an outer surface thereof serving as a design surface, the ridge portion being substantially parallel with the wheel arch portion; and the flange extend along the ridge portion.

In this configuration, the flange is disposed on the inner surface of the bumper side part along the ridge portion on the outer surface of the bumper side part, the ridge portion being substantially parallel with the wheel arch portion. Thus, sink marks that tend to occur on the outer surface (design surface) of the bumper side part along the flange can be made less noticeable. Therefore, it is possible to ensure design freedom that can accommodate the design of the bumper (e.g., it is possible to freely set the position of the ridge portion) and enhance design characteristics.

It is preferable that the flange have a base portion extending continuously to the inner surface of the bumper side part, and an extending portion extending inwardly from the base portion in the vehicle width direction; and the base portion be formed to be thinner than the extending portion.

In this configuration, where the flange is formed to be thinner at the base portion, the occurrence of sink marks on the outer surface (design surface) of the bumper side part can be reduced at a position corresponding to the flange. It is thus possible to freely set the position of the flange and enhance design characteristics.

It is preferable that the flange be substantially parallel with the wheel arch portion, the wheel arch bracket be substantially fan-shaped as viewed in the vehicle width direction, and the plurality of vertical walls be arranged to extend radially from the component supporting portion toward the flange mount portion.

In this configuration, the flange is substantially parallel with the wheel arch portion, the wheel arch bracket is substantially fan-shaped as viewed in the vehicle width direction, and the plurality of vertical walls are arranged to extend radially from the component supporting portion toward the flange mount portion. This further improves stiffness for supporting the fender components in the bumper side part. It is thus possible to further reduce the bulge of the bumper side part caused by wind pressure during running of the vehicle.

Thus, it is possible to provide a vehicle bumper structure that can improve the degree of freedom of designing fender components and flanges, and enhance the support stiffness of bumper side parts.

BRIEF DESCRIPTION OF THE DRAWINGS

The advantages of the disclosure will become apparent in the following description taken in conjunction with the following drawings.

FIG. 1 is a perspective view of a vehicle having a vehicle bumper structure according to an embodiment, as viewed from the left rear of the vehicle.

FIG. 5A is a perspective view of a wheel arch bracket as viewed from the front of the vehicle interior, and FIG. 5B is a perspective view of the wheel arch bracket as viewed from the rear of the vehicle exterior.

FIG. 6A, FIG. 6B, and FIG. 6C are perspective views of the bumper side part and fender components as viewed from the inside of a wheel housing, with FIG. 6A illustrating attachment of an inner panel, FIG. 6B illustrating attachment of a fender cover, and FIG. 6C illustrating attachment of an inner fender.

DETAILED DESCRIPTION

Figure 2:
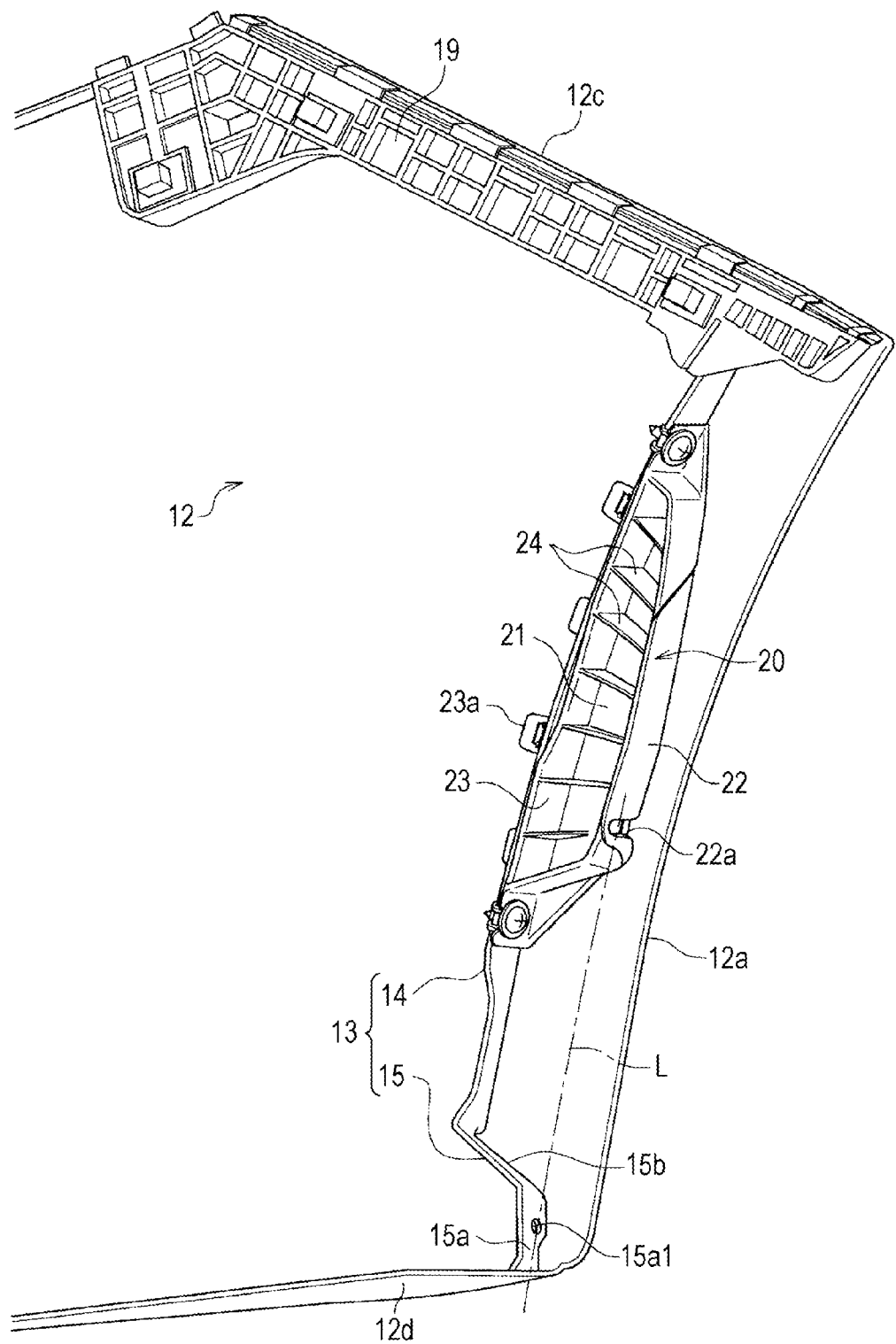
FIG. 2 is a perspective view of a bumper side part as viewed from the inside.

Embodiments will now be described in detail with reference to FIG. 1 to FIG. 7. The embodiments describe a rear bumper of a car C, which is a vehicle. In the description, identical elements are given the same reference numerals and overlapping description will be omitted. The directions, such as front and rear, right and left, and up and down, are as viewed from the driver of the vehicle.

As illustrated in FIG. 1, the car C includes a rear bumper 10 (vehicle bumper structure) in its rear end portion C1, and wheel housings C2 in which wheels W are housed. Fender components F constituting a fender that covers the upper half of each wheel W are attached to the interior of the corresponding wheel housing C2. The fender components F are described later on.

The rear bumper 10 mainly includes a bumper central part 11 extending in the vehicle width direction to cover the rear end portion C1 of the car C, and a pair of bumper side parts 12 extending from both right and left ends of the bumper central part 11 toward the respective wheel housings C2. The rear bumper 10 is substantially U-shaped in plan view. The front end portion of each of the bumper side parts 12 faces the wheel housing C2 and has an arch shape to form a wheel arch portion 12a that constitutes part of a wheel arch. The outer surface (design surface) of each of the bumper side parts 12 has a curved ridge portion 12b parallel with the wheel arch portion 12a.

Since the pair of bumper side parts 12 is right-left symmetric, only the bumper side part 12 on the left will be described herein and the description of the bumper side part 12 on the right will be omitted.

As illustrated in FIG. 2, the bumper side part 12 has a flange 13 on the inner surface thereof. A wheel arch bracket 20 is attached to the flange 13. An upper edge of the bumper side part 12 forms a fender mount portion 12c to be connected to a fender panel C3. The fender mount portion 12c is provided with a bumper spacer 19.

Figure 3B:
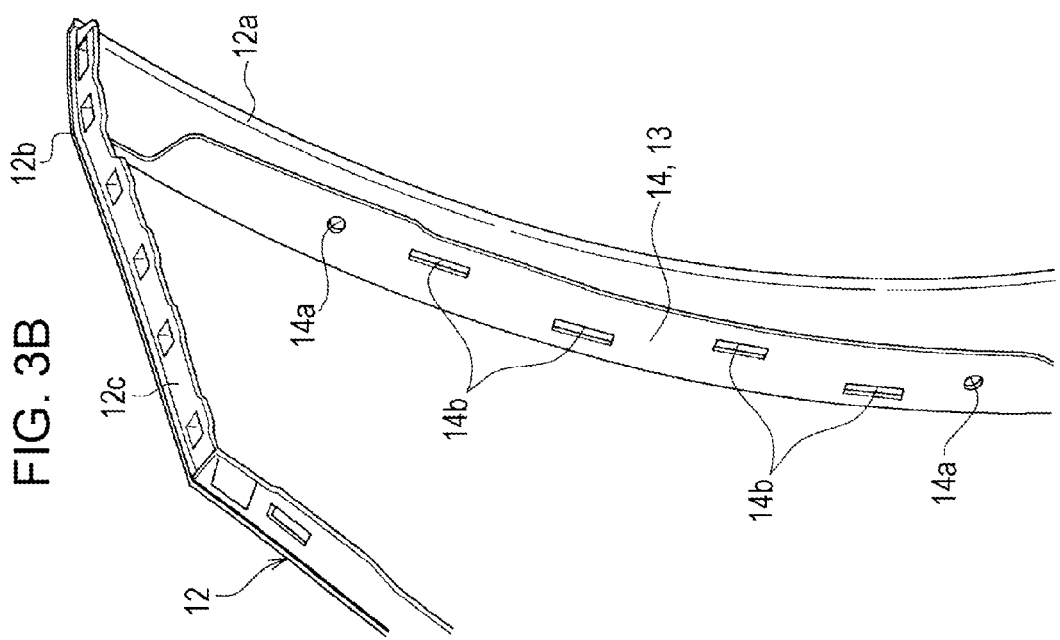
FIG. 3B is a perspective view of the flange as viewed from the rear of the vehicle.
Figure 3A:
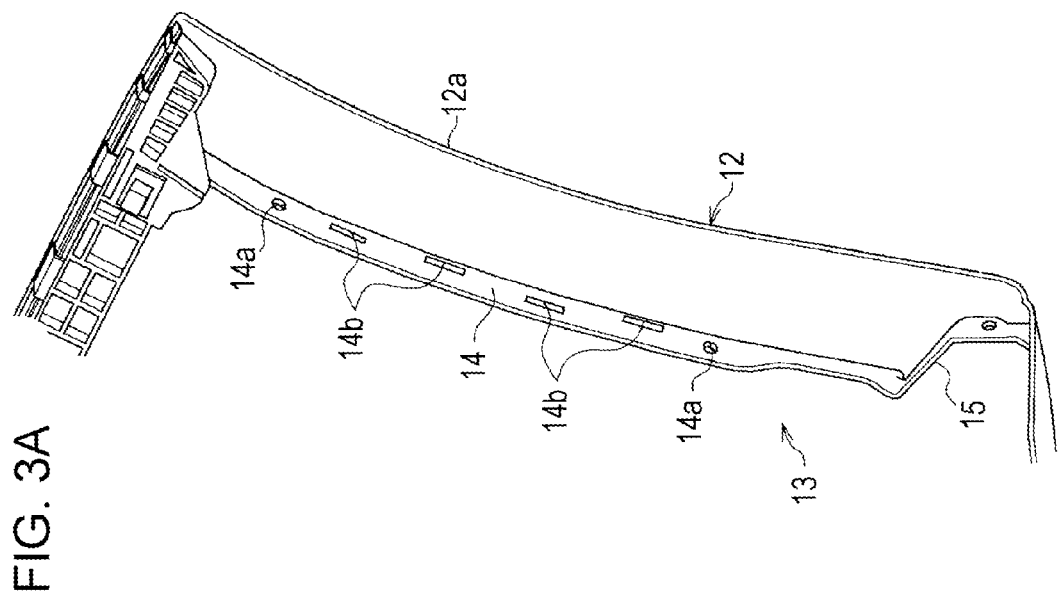
FIG. 3A is a perspective view of a flange as viewed from the front of the vehicle.

As illustrated in FIG. 2 and FIGS. 3A and 3B, the flange 13 is a wall-like portion protruding and standing on the inner surface of the bumper side part 12 toward the interior of the vehicle. The flange 13 is molded integrally with the bumper side part 12. The flange 13 serves as a rib that supports the wheel arch bracket 20 and enhances the stiffness of the bumper side part 12. The flange 13 has a flange body 14 to which the wheel arch bracket 20 is attached, and a bent part 15 extending continuously from the lower end of the flange body 14 toward the wheel arch portion 12a.

As illustrated in FIG. 3A and FIG. 3B, the flange body 14 is curved substantially in parallel with the wheel arch portion 12a. The bumper side part 12 is curved to bulge toward the outside of the vehicle at the center thereof in the up-and-down direction of the vehicle. The flange body 14 is also curved to bulge toward the outside of the vehicle along the curved shape of the bumper side part 12.

The flange body 14 has a pair of screw holes 14a for screwing the wheel arch bracket 20 to the flange body 14. The screw holes 14a are spaced apart from each other in the up-and-down direction. The flange body 14 has engagement holes 14b, between the screw holes 14a, for insertion of clips 23a (see FIG. 5A and FIG. 5B) of the wheel arch bracket 20. The engagement holes 14b are staggered in the up-and-down direction of the vehicle.

As illustrated in FIG. 1 and FIG. 3B, the flange body 14 is formed along the ridge portion 12b on the outer surface of the bumper side part 12. In other words, the flange body 14 is formed on the inner surface of the bumper side part 12 and located at a position corresponding to the ridge portion 12b. Thus, sink marks appearing on the outer surface of the bumper side part 12 when the flange body 14 is integrally molded with the bumper side part 12 can be made less noticeable.

Figure 7:
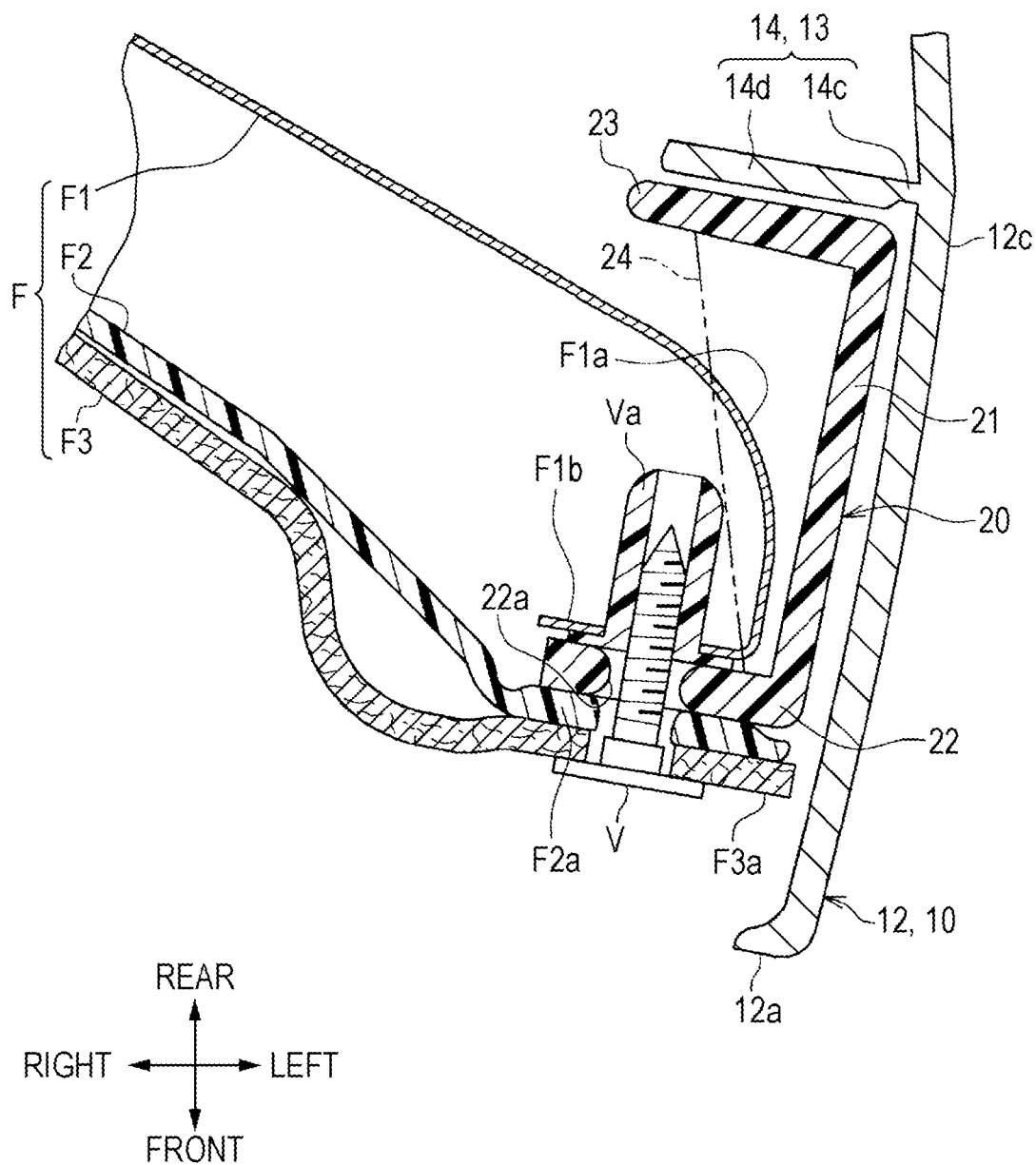
FIG. 7 is a cross-sectional view as viewed in the direction of arrow VII-VII in FIG. 6C.

As illustrated in FIG. 7, the flange body 14 has a base portion 14c extending continuously from the inner surface of the bumper side part 12, and an extending portion 14d extending inwardly from the base portion 14c in the vehicle width direction. The base portion 14c is formed to be thinner than the extending portion 14d. This can reduce the occurrence of sink marks on the outer surface of the bumper side part 12 when the flange body 14 is integrally molded with the bumper side part 12.

Figure 4:
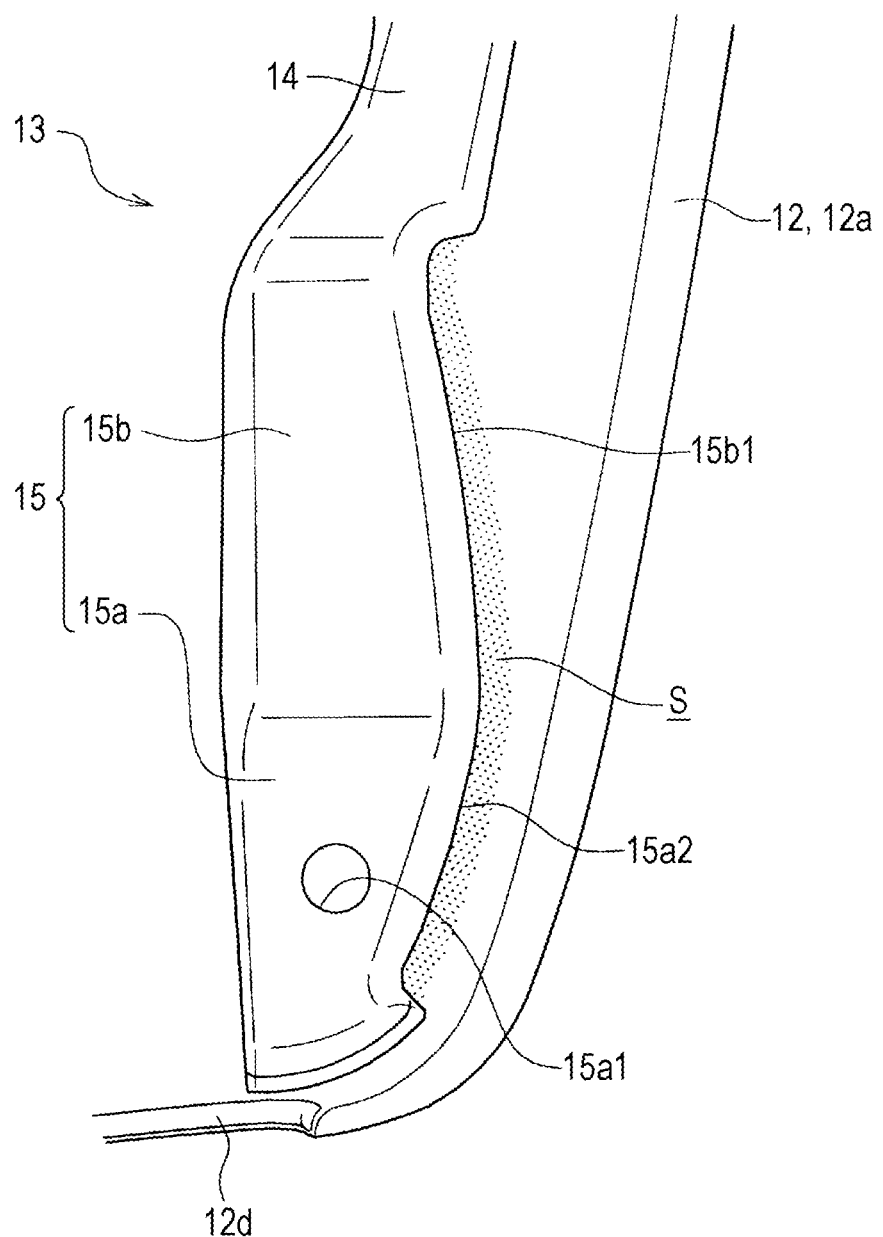
FIG. 4 is an enlarged perspective view of a bent part as viewed from the front of the vehicle.

As illustrated in FIG. 2, FIG. 3A, and FIG. 4, the bent part 15 has a component mount portion 15a for mounting the fender components F, and a connecting portion 15b that connects the flange body 14 to the component mount portion 15a.

The component mount portion 15a is a wall-like portion formed substantially in parallel with the flange body 14. The component mount portion 15a has a screw hole 15a1 for insertion of a fastener V (see FIG. 6A to FIG. 6C) for fastening the fender components F. As illustrated in FIG. 2, the component mount portion 15a is located on a virtual line L passing through a component supporting portion 22 (described below) of the wheel arch bracket 20 and substantially parallel with the wheel arch portion 12a. The upper end portion of the component mount portion 15a is supported by the connecting portion 15b, and the lower end portion of the component mount portion 15a is supported by the bumper side part 12 (more specifically, by a stepped portion 12d at the lower end of the bumper side part 12).

The connecting portion 15b is a portion that connects the lower end portion of the flange body 14 to the upper end portion of the component mount portion 15a.

As illustrated in FIG. 4, an edge 15a2 of the component mount portion 15a adjacent to the bumper side part 12 is spaced from the inner surface of the bumper side part 12. An edge 15b1 of the connecting portion 15b adjacent to the bumper side part 12 is spaced from the inner surface of the bumper side part 12. Thus, a space S is created between the bent part 15 and the bumper side part 12. This can prevent the bent part 15 from causing the occurrence of sink marks on the bumper side part 12.

As illustrated in FIG. 2 and FIGS. 5A and 5B, the wheel arch bracket 20 is a member that extends between the flange 13 and the fender components F (see FIG. 6A to FIG. 6C) in the up-and-down direction of the vehicle and supports the fender components F. The wheel arch bracket 20 is a resin member integrally formed by injection molding. The wheel arch bracket 20 is formed into a substantially fan shape (or substantially trapezoidal shape) as viewed in the vehicle width direction. The wheel arch bracket 20 is integrally molded with the rear bumper 10 near a pouring gate for bumper molding (not shown) above the bumper central part 11.

The wheel arch bracket 20 mainly includes a bottom wall 21 having a substantially fan shape (or substantially trapezoidal shape), the component supporting portion 22 standing at an edge of the bottom wall 21 adjacent to the wheel arch portion 12a, a flange mount portion 23 standing at an edge of the bottom wall 21 adjacent to the flange 13, and a plurality of vertical walls 24 extending from the component supporting portion 22 toward the flange mount portion 23.

As illustrated in FIG. 5A and FIG. 5B, the bottom wall 21 is a member that extends along the inner surface of the bumper side part 12. Like the bumper side part 12, the bottom wall 21 is curved to bulge toward the outside of the vehicle at the center thereof in the up-and-down direction of the vehicle.

The component supporting portion 22 is a wall-like member for supporting the fender components F. The component supporting portion 22 stands along an edge of the bottom wall 21 adjacent to the wheel arch portion 12a. The component supporting portion 22 has, at the lower end thereof, an insertion hole 22a for insertion of the fastener V for fastening the fender components F.

The flange mount portion 23 is a wall-like member attached to the flange 13. The flange mount portion 23 stands along an edge of the bottom wall 21 adjacent to the flange 13. A plurality of clips 23a (four clips 23a in the present embodiment) protrude on a side face of the flange mount portion 23 adjacent to the flange 13. The clips 23a serving as engaging portions are staggered in the up-and-down direction and located at positions corresponding to the respective engagement holes 14b of the flange body 14. The flange mount portion 23 has, at upper and lower ends thereof, notches 23b for insertion of screws. The notches 23b are located at positions corresponding to the respective screw holes 14a of the flange body 14.

The vertical walls 24 are wall-like members that stand on the bottom wall 21 and connect the component supporting portion 22 to the flange mount portion 23. The vertical walls 24 are spaced apart from each other in the up-and-down direction. The vertical walls 24 may serve as ribs. The vertical walls 24 are arranged to extend radially from the component supporting portion 22 toward the flange mount portion 23. In other words, the distances between adjacent vertical walls 24 are larger on a side adjacent to the flange mount portion 23 than on a side adjacent to the component supporting portion 22. Thus, the supporting force acting on the component supporting portion 22 for supporting the fender components F can be distributed to the flange mount portion 23 (or to the flange body 14).

As illustrated in FIG. 7, the height of the vertical walls 24 from the bottom wall 21 is lower on the side adjacent to the component supporting portion 22 than on the side adjacent to the flange mount portion 23. This allows part of the fender components F to be placed inside the component supporting portion 22 (i.e., on a side of the component supporting portion 22 adjacent to the flange mount portion 23).

As illustrated in FIG. 6A to FIG. 6C, the fender components F include an arched inner panel F1 made of metal, a fender cover F2 made of resin and attached to a rear end of the inner panel F1, and an arched inner fender F3 made of nonwoven fabric and covering the inner panel F1.

As illustrated in FIG. 6A, a vehicle exterior side F1a of a lower end of the inner panel F1 is disposed on the rear side (or inside) of the component supporting portion 22 of the wheel arch bracket 20. As illustrated in FIG. 7, the vehicle exterior side F1a at the lower end of the inner panel F1 has a folded portion F1b, which is provided with a receiving member Va for insertion of the fastener V, such as a tapping screw.

As illustrated in FIG. 6B, a vehicle exterior side F2a of an upper end of the fender cover F2 is disposed on the front side (or outside) of the component supporting portion 22 of the wheel arch bracket 20. A vehicle exterior side F2b of a lower end of the fender cover F2 is disposed on the front side of the component mount portion 15a of the bent part 15 of the flange 13.

As illustrated in FIG. 6C, a vehicle exterior side F3a of a lower end of the inner fender F3 is disposed over the vehicle exterior side F2a of the upper end of the fender cover F2. A vehicle interior side F3b of the lower end of the inner fender F3 is disposed over a vehicle interior side F2c of the upper end of the fender cover F2.

As illustrated in FIG. 7, the fender components F are connected at one point to the wheel arch bracket 20 by inserting the fastener V through the fender components F and screwing it into the receiving member Va, with the folded portion F1b of the inner panel F1, the insertion hole 22a of the component supporting portion 22, the vehicle exterior side F2a of the upper end of the fender cover F2, and the vehicle exterior side F3a of the lower end of the inner fender F3 stacked in this order from the rear side.

The vehicle bumper structure according to the present embodiment is basically configured as described above. The advantages of the vehicle bumper structure will now be described with reference to FIG. 1 to FIG. 7.

In the rear bumper 10 (vehicle bumper structure) according to the present embodiment, as illustrated in FIG. 2, the wheel arch bracket 20 is disposed between the flange body 14 of the rear bumper 10 and the fender components F. Thus, by varying the mounting position and the width of the wheel arch bracket 20 in the front-and-rear direction of the vehicle, the component supporting portion 22 can be adjusted to fit the shapes of the fender components F. Therefore, a high degree of freedom of designing the fender components F and the flange 13 can be ensured. At the same time, since the component supporting portion 22 is on the inner surface of the bumper side part 12 and thus is invisible from outside the vehicle, enhanced appearance (or design characteristics) can be achieved.

As described above, the wheel arch bracket 20 includes the vertical walls 24 that extend from the component supporting portion 22 toward the flange mount portion 23. This improves stiffness for supporting the fender components F disposed inside the bumper side part 12, and reduces the bulge of the bumper side part 12 caused by wind pressure during running of the vehicle.

As described above, the flange 13 is integrally molded with the bumper side part 12. Thus, as compared to the configuration where the flange 13 is formed separately, the accuracy of fitting the fender components F can be more stabilized. At the same time, the number of components and the number of worker-hours can be reduced.

As illustrated in FIG. 5B, the clips 23a of the flange mount portion 23 are staggered in the up-and-down direction of the vehicle, and the wheel arch bracket 20 extends along the inner surface of the bumper side part 12. Thus, since the bumper side part 12 and the wheel arch bracket 20 move together, it is possible to further improve stiffness for supporting the fender components F in the bumper side part 12.

As illustrated in FIG. 2, the flange 13 is bent toward the wheel arch portion 12a, and the component mount portion 15a is located on the virtual line L passing through the component supporting portion 22 and substantially parallel with the wheel arch portion 12a. This increases the section modulus of the bumper side part 12 and can further improve stiffness for supporting the fender components F in the vicinity of the wheel arch portion 12a.

As illustrated in FIG. 4, the space S is created between the bent part 15 and the bumper side part 12. This can reduce occurrence of sink marks on the outer surface (design surface) of the bumper side part 12 at a position corresponding to the bent part 15, allow free positioning of the flange 13, ensure a high degree of design freedom, and enhance design characteristics.

As illustrated in FIG. 3B, the flange 13 is disposed on the inner surface of the bumper side part 12 along the ridge portion 12b on the outer surface of the bumper side part 12, the ridge portion 12b being substantially parallel with the wheel arch portion 12a. Thus, sink marks that tend to occur on the outer surface (design surface) of the bumper side part 12 along the flange 13 can be made less noticeable. Since the flange 13 is aligned with the ridge portion 12b as described above, it is possible to ensure design freedom that can accommodate the design of the rear bumper 10 (e.g., it is possible to freely set the position of the ridge portion 12b) and enhance design characteristics.

As illustrated in FIG. 7, the base portion 14c of the flange body 14 is formed to be thinner than the extending portion 14d. This can reduce the occurrence of sink marks on the outer surface (design surface) of the bumper side part 12 at a position corresponding to the flange body 14. It is thus possible to freely set the position of the flange body 14 (or the flange 13) and enhance design characteristics.

As illustrated in FIG. 2, the flange body 14 is substantially parallel with the wheel arch portion 12a, the wheel arch bracket 20 is substantially fan-shaped as viewed in the vehicle width direction, and the plurality of vertical walls 24 are arranged to extend radially from the component supporting portion 22 toward the flange mount portion 23. This further improves stiffness for supporting the fender components F in the bumper side part 12. It is thus possible to further reduce the bulge of the bumper side part 12 caused by wind pressure during running of the vehicle.

The embodiments have been described in detail with reference to the drawings, but various changes can be made without departing from the scope of the embodiments.

For example, although the rear bumper 10 has been described in the embodiments, the vehicle bumper structure may be a front bumper.

Although the wheel arch bracket 20 is disposed on the front side of the flange 13 in the embodiments, the wheel arch bracket 20 may be disposed on the rear side of the flange 13. Thus, the positional relationship between the wheel arch portion 12a and the fender components F can be adjusted by varying the arrangement of the wheel arch bracket 20.

Although the bent part 15 is located at the lower end of the flange 13 in the embodiments, the bent part 15 (or component mount portion 15a) may be located at the upper end or in the middle of the flange 13. The bent part 15 may not even be provided as long as a sufficient stiffness for supporting the fender components F can be ensured.

I claim:

1. A vehicle bumper structure comprising:
    a bumper central part disposed at a longitudinal end of a vehicle and extending in a vehicle width direction;
    a bumper side part configured to extend from an end of the bumper central part toward a wheel housing;
    a wheel arch portion disposed at an end of the bumper side part to face the wheel housing;
    a flange configured to protrude from an inner surface of the bumper side part, the flange being integrally provided with the bumper side part;
    a wheel arch bracket disposed on the flange to extend in a substantially vertical direction of the vehicle; and
    fender components disposed on and supported by the wheel arch bracket,
    wherein the wheel arch bracket includes:

a component supporting portion configured to support the fender components, a flange mount portion disposed opposite to the component supporting portion and attached to the flange, wherein the wheel arch bracket further includes a plurality of vertical walls configured to extend from the component supporting portion to the flange mount portion, wherein the flange extends substantially parallel with the wheel arch portion, the wheel arch bracket is substantially fan-shaped as viewed from the vehicle width direction, and the plurality of vertical walls are disposed to extend radially from the component supporting portion toward the flange mount portion.

2. The vehicle bumper structure according to claim 1, wherein the flange mount portion includes a plurality of engaging portions configured to engage with the flange, the engaging portions being staggered in the substantially vertical direction of the vehicle;

a substantially center portion of the bumper side part in the substantially vertical direction of the vehicle bulges toward an outside of the vehicle; and the wheel arch bracket is disposed along the inner surface of the bumper side part.

3. The vehicle bumper structure according to claim 1, wherein the flange includes a bent part bent toward the wheel housing, the bent part being at least partially spaced apart from the inner surface of the bumper side part;

the bent part includes a component mount portion to which the fender components are attached; and the component mount portion is located on a virtual line extending from the component supporting portion substantially in parallel with the wheel arch portion.

4. The vehicle bumper structure according to claim 1, wherein the bumper side part includes a ridge portion on an outer surface thereof, the ridge portion extending substantially parallel with the wheel arch portion; and the flange is disposed along the ridge portion.

5. The vehicle bumper structure according to claim 1, wherein the flange includes a base portion extending continuously from the inner surface of the bumper side part, and an extending portion extending inwardly from the base portion in the vehicle width direction, and wherein the base portion is thinner than the extending portion.

\* \* \* \* \*